United States Patent
Wang et al.

(10) Patent No.: US 11,526,774 B2
(45) Date of Patent: Dec. 13, 2022

(54) METHOD FOR AUTOMATICALLY COMPRESSING MULTITASK-ORIENTED PRE-TRAINED LANGUAGE MODEL AND PLATFORM THEREOF

(71) Applicant: ZHEJIANG LAB, Hangzhou (CN)

(72) Inventors: Hongsheng Wang, Hangzhou (CN); Haijun Shan, Hangzhou (CN); Jiaqing Fu, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 17/564,071

(22) Filed: Dec. 28, 2021

(65) Prior Publication Data

US 2022/0188658 A1    Jun. 16, 2022

Related U.S. Application Data

(63) Continuation of application No. PCT/CN2020/138016, filed on Dec. 21, 2020.

(51) Int. Cl.
*G06N 5/02* (2006.01)
*G06N 3/08* (2006.01)
*G06K 9/62* (2022.01)
*G06N 3/12* (2006.01)

(52) U.S. Cl.
CPC ............ *G06N 5/022* (2013.01); *G06K 9/6256* (2013.01); *G06K 9/6277* (2013.01); *G06N 3/086* (2013.01); *G06N 3/126* (2013.01)

(58) Field of Classification Search
CPC ........ G06N 5/022; G06N 3/086; G06N 3/126; G06K 9/6256; G06K 9/6277
See application file for complete search history.

(56) References Cited

U.S. PATENT DOCUMENTS

| | | | |
|---|---|---|---|
| 2020/0110982 A1* | 4/2020 | Gou | G06N 3/088 |
| 2021/0010692 A1* | 1/2021 | Worrilow | F24F 3/167 |

(Continued)

FOREIGN PATENT DOCUMENTS

| | | | |
|---|---|---|---|
| CN | 110162018 A | * | 8/2019 |
| CN | 111062489 A | | 4/2020 |

(Continued)

OTHER PUBLICATIONS

Wei, L. et al. (Aug. 2020). "Circumventing outliers of autoaugment with knowledge distillation". In European Conference on Computer Vision (pp. 608-625). Springer, Cham. arXiv:2003.11342v1 (Year: 2020).*

(Continued)

*Primary Examiner* — Eric Nilsson
(74) *Attorney, Agent, or Firm* — W&G Law Group

(57) ABSTRACT

Disclosed is a method for automatically compressing multi-task oriented pre-trained language model and a platform thereof. According to the method, a meta-network of a structure generator is designed, a knowledge distillation coding vector is constructed based on a knowledge distillation method of Transformer layer sampling, and a distillation structure model corresponding to a currently input coding vector is generated by using the structure generator; at the same time, a Bernoulli distribution sampling method is provided for training the structure generator; in each iteration, each encoder unit is transferred by Bernoulli distribution sampling to form a corresponding coding vector; by changing the coding vector input to the structure generator and a small batch of training data, the structure generator and the corresponding distillation structure are jointly trained, and a structure generator capable of generating weights for different distillation structures can be acquired.

10 Claims, 5 Drawing Sheets

(56) References Cited

U.S. PATENT DOCUMENTS

| | | | | |
|---|---|---|---|---|
| 2022/0067274 A1* | 3/2022 | Wang | ..................... | G06N 20/20 |
| 2022/0083739 A1* | 3/2022 | Magnusson | ............ | G06N 20/00 |
| 2022/0108131 A1* | 4/2022 | Kuen | ................... | G06K 9/6257 |

FOREIGN PATENT DOCUMENTS

| | | | | | |
|---|---|---|---|---|---|
| CN | 111611377 A | * | 9/2020 | .......... | G06F 16/355 |
| CN | 111611377 A | | 9/2020 | | |
| CN | 111737406 A | * | 10/2020 | | |
| CN | 111767711 A | * | 10/2020 | ............ | G06F 40/20 |
| CN | 111767711 A | | 10/2020 | | |
| CN | 112232511 A | * | 1/2021 | | |
| CN | 112241455 A | * | 1/2021 | ............ | G06F 16/35 |
| CN | 112347245 A | * | 2/2021 | | |
| CN | 112395892 A | * | 2/2021 | ............ | G06F 40/58 |
| CN | 112418291 A | * | 2/2021 | | |
| CN | 112465138 A | * | 3/2021 | | |
| CN | 112509555 A | * | 3/2021 | ........... | G10L 15/005 |
| CN | 112613273 A | * | 4/2021 | | |
| CN | 113743432 A | * | 12/2021 | | |

OTHER PUBLICATIONS

Sun, S. et al. (2019). "Patient knowledge distillation for BERT model compression". arXiv preprint arXiv: 1908.09355. (Year: 2019).*

Hu, Y., et al. (2018). "A novel channel pruning method for deep neural network compression". arXiv preprint arXiv: 1805.11394. (Year: 2018).*

Li, C. et al. (Aug. 2018). "Compression of acoustic model via knowledge distillation and pruning". In 2018 24th International conference on pattern recognition (ICPR) (pp. 2785-2790). IEEE. (Year: 2018).*

Xu, C., et al. (2020). "Bert-of-theseus: Compressing bert by progressive module replacing". arXiv preprint arXiv:2002.02925. (Year: 2020).*

Lan, Z. et al. (2019). "Albert: Alite bert for self-supervised learning of language representations". arXiv preprint arXiv: 1909.11942. (Year: 2019).*

International Search Report (PCT/CN2020/138016); dated Sep. 2, 2021.

First Office Action(202011470331.3); dated Jan. 22, 2021.

Barbalau, A. et al. Black-Box Ripper: Copying black-box models using generative evolutionary algorithms; Date of Mailing: Oct. 21, 2020 Document appears to be originally in English, not a translation.

Methods and progress in deep neural network model compression; Date of Mailing: Sep. 30, 2020 English translation is only the abstract.

Hinton, G. et al. Distilling the Knowledge in a Neural Network; Date of Mailing: Mar. 9, 2015 Document appears to be originally in English, not a translation.

* cited by examiner

METHOD FOR AUTOMATICALLY COMPRESSING MULTITASK-ORIENTED PRE-TRAINED LANGUAGE MODEL AND PLATFORM THEREOF

CROSS-REFERENCE TO RELATED APPLICATIONS

The present application is a continuation of International Application No. PCT/CN2020/138016, filed on Dec. 21, 2020, which claims priority to Chinese Application No. 202011470331.3, filed on Dec. 15, 2020, the contents of both of which are incorporated herein by reference in their entireties.

TECHNICAL FIELD

The present application belongs to the field of language model compression, in particular to a method for automatically compressing multi-task oriented pre-trained language model and a platform thereof.

BACKGROUND

Large-scale pre-trained language models have achieved excellent performance in natural language understanding and generation tasks. However, deploying pre-trained language models with massive parameters to devices with a limited memory still faces great challenges. In the field of model compression, the existing language model compression methods are all language model compression for specific tasks. Although knowledge distillation for specific tasks is very effective, fine-tuning and reasoning for large models is still time-consuming and costly. When facing other downstream tasks, the pre-trained model generated by distillation with specific task knowledge still needs to fine-tune the large model and generate relevant large model knowledge.

Most of the knowledge distillation strategies used in the existing model compression are layer-by-layer knowledge distillation, that is, given a teacher network and a student network, in order to supervise and train the student network, the method of layer-by-layer knowledge distillation is to minimize the distance between the feature maps of the two networks. When the training data is sufficient, this method can usually achieve better results. However, in the case of small sample data, training is easily affected by over-fitting, and the estimation error increases significantly and will spread layer by layer. Therefore, the core challenge of neural network compression in the case of small samples is that the compressed model is easy to over-fit on training instances with few samples, which leads to a large estimation error between the inference process and the original network. Estimation errors may accumulate and spread layer by layer, and eventually destroy the network output.

In addition, the existing knowledge distillation methods are mainly data-driven sparse constraints or artificially designed distillation strategies; considering that a Bidirectional Encoder Representations from Transformers (BERT) network usually has 12 layers of Transformer units, each unit contains 8 self-attention units; there are hundreds of millions of possible connection modes of self-attention units, and due to the limitation of computational resources, it is almost impossible to design all possible distillation structures manually and find the optimal structure.

SUMMARY

The purpose of the present application is to provide a method for automatically compressing multi-task oriented pre-trained language model and a platform thereof aiming at the shortcomings of the prior art.

The purpose of the present application is realized by the following technical solution: a method for automatically compressing multi-task oriented pre-trained language model, comprising the following three stages:

A first stage of constructing a knowledge distillation coding vector based on Transformer layer sampling: layer-sampling all Transformer units of a BERT model by Bernoulli distribution to generate the knowledge distillation coding vector.

A second stage of training a knowledge distillation network of meta-learning: defining a search space, inputting the knowledge distillation coding vector constructed in the first stage into the search space, and removing unqualified knowledge distillation coding vectors; defining a structure generator, which takes the filtered knowledge distillation coding vector as an input, outputs a weight matrix for constructing a distillation structure model, and generates the corresponding distillation structure model; training the generated distillation structure model to update the structure generator.

A third stage of searching the distillation structure model based on an evolutionary algorithm: inputting a plurality of knowledge distillation coding vectors satisfying specific constraints into the updated structure generator in the second stage to generate the corresponding weight matrix, and obtaining a plurality of distillation structure models; evaluating the accuracy of each distillation structure model; using the evolutionary algorithm to search the distillation structure model with the highest accuracy that meets the specific constraints, and obtaining a common compression structure.

Furthermore, the first stage comprises: sequentially carrying out Bernoulli sampling on 12 layers of Transformer units of the BERT model to generate the knowledge distillation coding vector, each layer corresponding to a random variable; wherein, when a probability of the random variable being 1 is greater than or equal to 0.5, an element corresponding to the knowledge distillation coding vector is 1, which represents that a current Transformer unit performs transfer learning; when a probability value of the random variable being 1 is less than 0.5, the element corresponding to the layer sampling vector is 0, which represents that the current Transformer unit does not perform transfer learning.

Furthermore, the step of defining a search space is that a number of elements being 1 in the knowledge distillation coding vector is not less than 6.

Furthermore, the step of defining a structure generator is that the structure generator consists of two fully connected layers, the input of which is the knowledge distillation coding vector constructed in the first stage, and the output of which is the weight matrix for generating the distillation structure model.

Furthermore, the step of training the generated distillation structure model to update the structure generator comprises the following substeps:

Step (2.1): inputting the knowledge distillation coding vector into the structure generator and outputting the weight matrix.

Step (2.2): constructing the distillation structure model based on the weight matrix output by the structure generator.

Step (2.3): jointly training the structure generator and the distillation structure model: inputting the training data into the distillation structure model generated in step (2.2) for model training, and updating the structure generator together; meanwhile, training the structure generator by combining a Bernoulli distribution sampling method.

Furthermore, the step (2.2) comprises: performing layer sampling knowledge distillation on each Transformer layer of a teacher network according to the knowledge distillation coding vector constructed in the first stage, wherein each element corresponds to a layer of Transformer units, and initializing the Transformer units transferred by the student model by using a weight of the Transformer unit with an element corresponding to the knowledge distillation coding vector being 1 in the teacher model, i.e., the Transformer unit corresponding to the student model and the weight thereof are generated from each element with a layer sampling being 1 through the structure generator; establishing a one-to-one mapping relationship between the teacher model and the student model through the knowledge distillation coding vector, and generating a corresponding distillation network structure according to the knowledge distillation coding vector.

Furthermore, the step of training the structure generator by combining a Bernoulli distribution sampling method comprises: using Bernoulli distribution to perform layer sampling for the Transformer units in each layer to construct different knowledge distillation coding vectors, using a training data set to carry out multiple iterative trainings, training the structure generator and the distillation structure model simultaneously based on one knowledge distillation coding vector in each iteration, and acquiring the structure generator capable of generating weight matrices for different distillation structure models by changing the input knowledge distillation coding vectors.

Furthermore, the third stage comprises the following substeps:

Step (3.1): defining the knowledge distillation coding vector as genes of the distillation structure model, and randomly selecting a series of genes satisfying specific constraints as an initial population;

Step (3.2): evaluating the accuracy of the distillation structure model corresponding to each gene in an existing population, and selecting top k genes with a higher accuracy;

Step (3.3): using the top k genes with a higher accuracy selected in step (3.2) for gene recombination and gene mutation to generate new genes, and adding the new genes into the existing population;

Step (3.4): repeating and iterating steps (3.2) to (3.3) for a set number of rounds, selecting the top k genes with a higher accuracy in the existing population and generating new genes, and finally obtaining the genes with the highest accuracy that meet the specific constraints.

Furthermore, in step (3.3), gene mutation refers to randomly changing the values of some elements in the gene; gene recombination refers to randomly recombining the genes of two parents; new genes that do not meet the specific constraints are eliminated.

A platform based on the above method for automatically compressing the multi-task oriented pre-trained language model according to claim 1, comprising the following components:

A data loading component configured to obtain training samples of multi-task oriented pre-trained language model, wherein the training samples are tagged text samples that meet a supervised learning task.

An automatic compression component configured to automatically compress the multi-task oriented pre-trained language model, comprising a knowledge distillation vector coding module, a distillation network generation module, a structure generator and distillation network joint training module, a distillation network search module and a specific task fine-tuning module.

The knowledge distillation vector coding module comprises a layer sampling vector of Transformer; in a process of forward propagation, the knowledge distillation coding vector is input into the structure generator to generate a distillation network of a corresponding structure and a weight matrix of the structure generator.

The distillation network generation module constructs the distillation network corresponding to the currently input knowledge distillation coding vector based on the structure generator, and adjusts the shape of the weight matrix output by the structure generator to make the shape consistent with the number of encoder units of the input and output of the distillation structure corresponding to the knowledge distillation coding vector.

The structure generator and distillation network joint training module is an end-to-end training structure generator, and the knowledge distillation coding vector based on Transformer layer sampling and a small batch of training data are input into the distillation network; the weight of the distillation structure and the weight matrix of the structure generator are updated.

The distillation network search module is to search out the distillation network with the highest accuracy that meets the specific constraints, and proposes an evolutionary algorithm to search the distillation network with the highest accuracy that meets the specific constraints.

The knowledge distillation coding vector is input into the trained structure generator to generate the weight of the corresponding distillation network, and the distillation network is evaluated on a verification set to obtain the accuracy of the corresponding distillation network; in the evolutionary search algorithm used in a meta-learning distillation network, each distillation network is generated by knowledge distillation coding vectors based on Transformer layer sampling, therefore the knowledge distillation coding vectors are defined as the genes of the distillation network; under specific constraints, firstly, a series of knowledge distillation coding vectors are selected as the genes of the distillation network, and the accuracy of the corresponding distillation network is obtained by evaluating on the verification set; then, the top k genes with a higher accuracy are selected, and new genes are generated by gene recombination and mutation; by further repeating the process of selecting the top k optimal genes and the process of generating new genes to iterate, the genes that meet the constraint conditions and have the highest accuracy are obtained.

The specific task fine-tuning module is to construct a downstream task network on the pre-trained model distillation network generated by the automatic compression component, fine-tune a downstream task scene by using a feature layer and an output layer of the distillation network, and output a finally fine-tuned student model, i.e., a pre-trained language model compressed model containing the downstream task required by a login user; the compressed model is output to a designated container for the login user to download, and the comparison information of the model sizes before and after compression is presented on a page of an output compressed model of the platform.

A reasoning component configured for the login user to obtain the pre-trained compressed model from the platform. The user uses the compressed model output by the automatic compression component to reason new data of a natural language processing downstream task uploaded by the login user on a data set of an actual scene; and the comparison information of reasoning speeds before and after compression is presented on a compressed model reasoning page of the platform.

The present application has the following beneficial effects: firstly, the present application studies the common compression framework for generating various pre-trained language models by knowledge distillation based on meta-learning; secondly, based on the trained meta-learning network, an optimal compression structure is searched by an evolutionary algorithm, and the optimal common compression structure of task-independent pre-trained language model is obtained. The multitask-oriented pre-trained language model automatic compression platform of the present application is configured to compress and generate a common framework of the multitask-oriented pre-trained language model, the compressed model framework is fully configured to improve the compression efficiency of downstream tasks, and large-scale natural language processing models can be deployed in end devices with small memory, limited resources and the like, thus promoting the application process of the common deep language model in industry.

DESCRIPTION OF EMBODIMENTS

Figure 1:
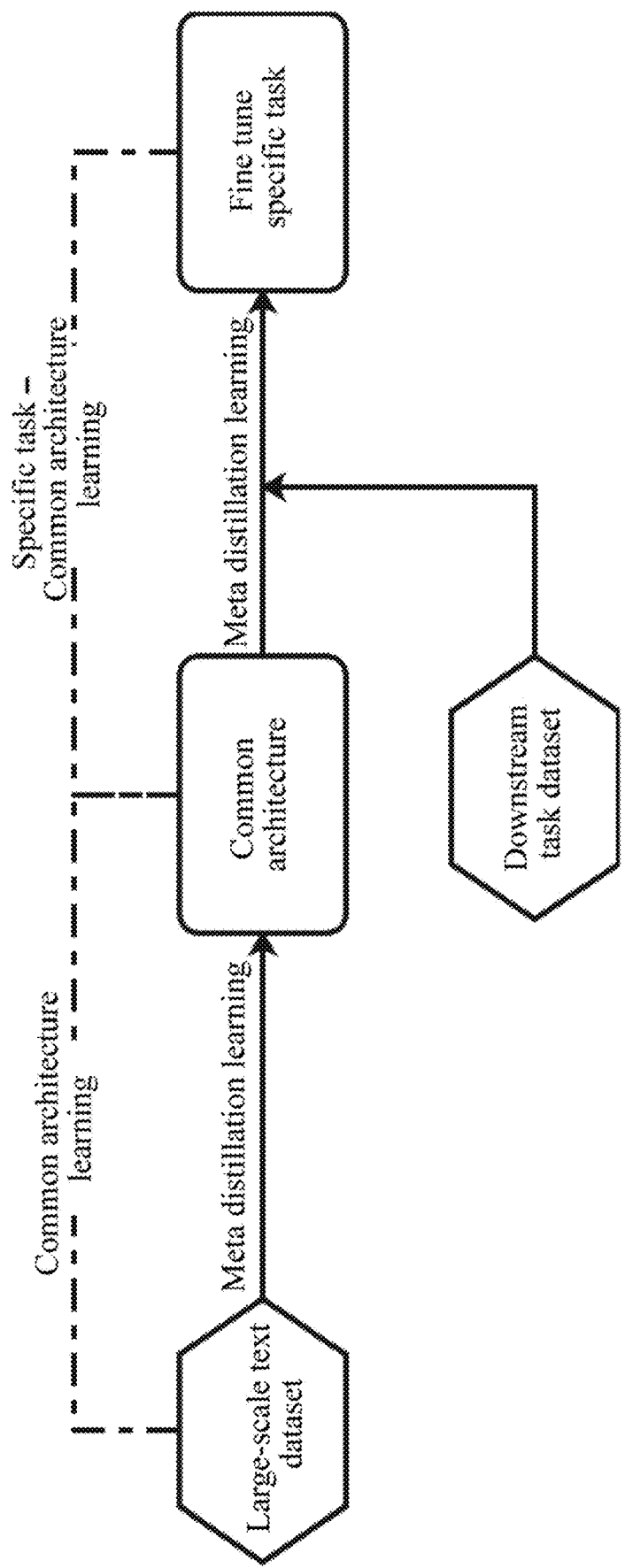
FIG. 1 is an overall architecture diagram of the compression method of the present application combined with specific tasks.

Inspired by the search of neural network architecture, especially in the case of few samples, automatic machine learning can carry out automatic knowledge distillation based on a feedback loop in an iterative manner. The present application studies the common compression architecture for generating various pre-trained language models by knowledge distillation based on meta-learning. The present application firstly constructs a knowledge distillation coding vector based on Transformer layer sampling, and distills the knowledge structure of large models at different levels. A meta-network of a structure generator is designed, and the structure generator is used to generate a distillation structure model corresponding to the currently input coding vector. At the same time, a Bernoulli distribution sampling method is proposed to train the structure generator. In each iteration, Bernoulli distributed sampling is configured to generate each transferred encoder units, which form the corresponding coding vector. By changing the coding vector input to the structure generator and a small batch of training data, and jointly training the structure generator and the corresponding distillation structure, the structure generator that can generate weights for different distillation structures can be acquired. At the same time, based on the trained meta-learning network, an optimal compression structure is searched by an evolutionary algorithm, and the optimal common compression structure of task-independent pre-trained language model is obtained. The method solves the problems of over-fitting learning and low generalization ability of the compressed model in a BERT model compression process with few samples of data, deeply explores the feasibility and key technologies of language understanding of large-scale deep language models under the condition of few samples, and improves the flexibility and effectiveness of the compressed model in the process of using for various downstream tasks. Compared with the existing knowledge distillation methods, the knowledge distillation of meta-learning can completely liberate the manpower from the tedious super parameter optimization, and at the same time allow the compressed model to be optimized directly by using various objective measurement methods. Compared with other automatic machine learning methods, knowledge distillation of meta-learning can easily implement conditional constraints when searching for the required compressed structure, without manually adjusting the hyperparameters of reinforcement learning. The present application technical route of the compression method of the present application is shown in FIG. 1. Based on a large-scale text data set, knowledge distillation based on meta-learning and automatic search of a distillation network based on an evolutionary algorithm are studied, and multi-task oriented large-scale pre-trained language model is automatically compressed by meta-distillation learning to generate a common architecture that meets different hard constraints (such as the number of operation times for a floating-point number) and is independent of tasks; when this common architecture is used, the downstream task network is built on the basis of a meta-distillation learning network, and the downstream task data set is input, so that only specific downstream tasks are fine-tuned, thus saving the calculation cost and improving the efficiency.

The present application relates to a method for automatically compressing multi-task oriented pre-trained language model. The whole process is divided into three stages: a first stage of constructing a knowledge distillation coding vector based on Transformer layer sampling; a second stage of training the knowledge distillation network of meta-learning; a third stage of searching an optimal compression structure based on an evolutionary algorithm, which is as below.

The first stage is: constructing a knowledge distillation coding vector based on Transformer layer sampling, wherein Bernoulli distribution is configured to layer sample all Transformer units of a BERT model to generate a layer sampling vector, that is, a knowledge distillation coding vector.

In some embodiments, it is assumed that transfer of an $i^{th}$ Transformer unit (encoder) is currently under consideration; a random variable $X_i \sim \text{Bernoulli}(p)$ is an independent Bernoulli random variable, with a probability of 1 being p and a probability of 0 being 1−p. The random variable $X_i$ is configured to sequentially perform Bernoulli sampling on the 12 layers of the Transformer units of the BERT model, and a vector consisting of 12 0 or 1 elements is generated. When the probability p of the random variable $X_i$ being 1 is greater than or equal to 0.5, the element corresponding to the layer sampling vector is 1, which represents the current Transformer unit performs transfer learning; when the probability value of the random variable Xi being 1 is less than 0.5, the element corresponding to the layer sampling vector is 0, which represents that the current Transformer unit does not perform transfer learning. By using Bernoulli sampling method, all Transformer units included in the BERT model are sequentially layer sampled to form knowledge distillation coding vector $\text{layer}_{sample}$. In this embodiment, $\text{layer}_{sample} = [l_1 \ldots l_i \ldots l_{12}]$, where $l_i$ is the $i^{th}$ element in $\text{layer}_{sample}$ and i=1-12.

Figure 2:
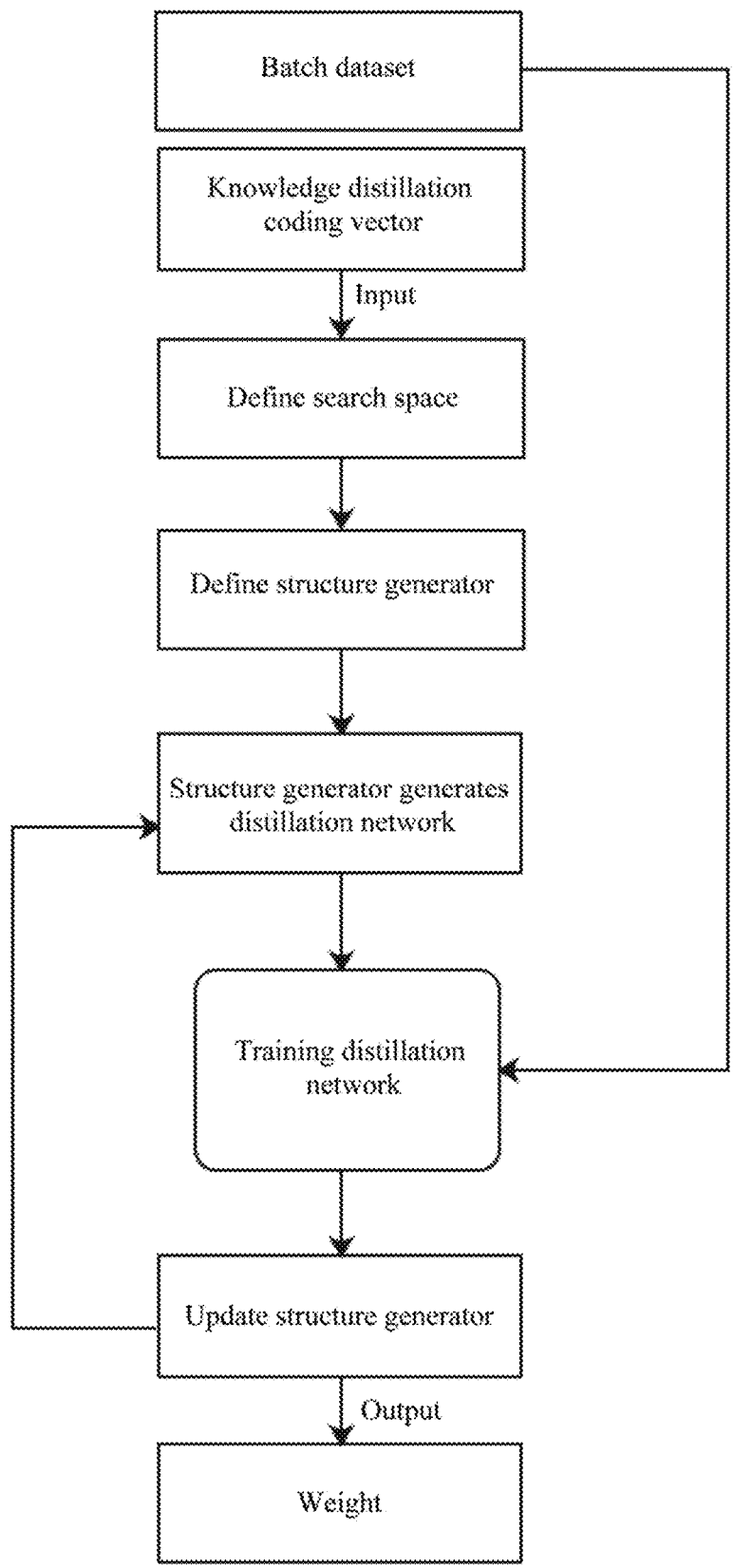
FIG. 2 is a training flow chart of a meta-learning knowledge distillation network.

The second stage is: training the knowledge distillation network of meta-learning. As shown in FIG. 2, A search space is defined, the knowledge distillation coding vectors constructed in the first stage are input into the search space, and the vectors that do not meet the constraint conditions are eliminated; a structure generator is defined, the filtered knowledge distillation coding vector is taken as an input, a weight matrix for constructing a distillation network is output, and a corresponding distillation structure model is generated; the generated distillation structure is trained with a batch data set and the distillation structure is updated to update the structure generator; the weight output by the structure generator after iteration update is finally output.

Definition of search space: in order to prevent the number of layer sampling Transformer unit transfer ($l_i$=1) from being too small, it is proposed to increase the layer sampling constraint conditions:

$$\text{s.t. sum}(l_i==1) \geq 6$$

That is, every time a knowledge distillation network structure is generated, constraint conditions are constructed for the layer sampling stages of all Transformer units of the BERT model, so that the number of elements being 1 in the knowledge distillation coding vector is not less than 6, otherwise, layer sampling is performed again.

Definition of the structure generator: the structure generator is a meta-network, which consists of two fully connected layers; the input thereof is the knowledge distillation coding vector constructed for the first stage, and the output thereof is the weight matrix configured to generate a distillation structure model.

Training structure generator includes the following sub-steps:

Step 1: in the process of forward propagation, the knowledge distillation coding vector is input into the structure generator and the weight matrix is output.

Figure 3:
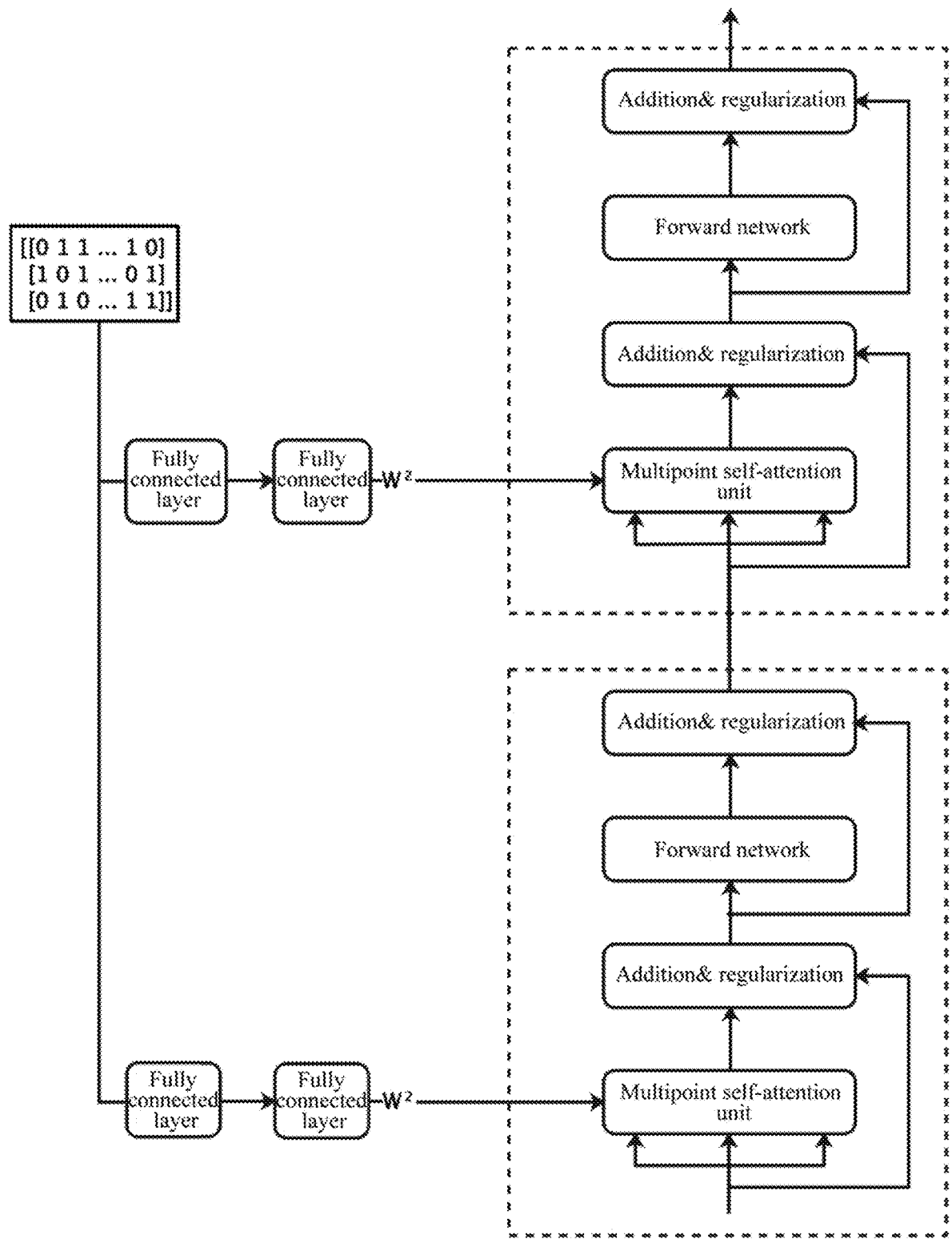
FIG. 3 is an architecture diagram of a distillation network based on a structure generator.

Step 2: as shown in FIG. 3, it shows a process of constructing a distillation structure model based on structure generator:

According to the knowledge distillation coding vector constructed in the first stage, each element $l_i$ corresponds to a layer of Transformer unit, layer sampling knowledge distillation is carried out on each Transformer layer of the teacher network, and the Transformer unit transferred by the student model is initialized by using a weight of the Transformer unit with an element corresponding to the knowledge distillation coding vector being 1; that is, the elements sampled as 1 in each layer pass through the structure generator to generate the Transformer unit corresponding to the student model and its weight; a one-to-one mapping relationship between the teacher model and the student model is established by the knowledge distillation coding vector, and a corresponding distillation network structure is generated according to the knowledge distillation coding vector.

Figure 4:
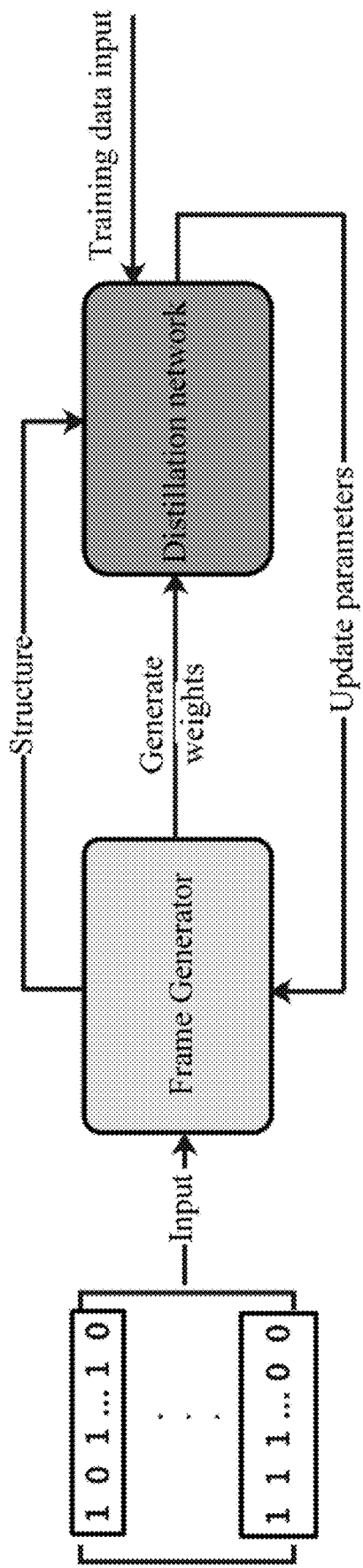
FIG. 4 is a diagram of the joint training process of a structure generator and a distillation network.

Step 3: as shown in FIG. 4, it shows a process of jointly training the structure generator and the distillation structure model:

A small batch of training data is input into the distillation structure model generated in step 2 for model training; after the distillation structure model updates the parameters (weight matrix), the structure generator also updates according to the updated parameters; that is, in the process of back propagation, the distillation structure model and the structure generator are updated together; the weight of the output of the structure generator can be calculated by the chain rule, so the structure generator can be trained end to end.

At the same time, the method of Bernoulli distribution sampling is proposed to train the structure generator, comprising: using Bernoulli distribution to perform layer sampling for the Transformer units in each layer to construct different knowledge distillation coding vectors, using a training data set to carry out multiple iterative trainings, training the structure generator and the distillation structure model simultaneously based on one knowledge distillation coding vector in each iteration, and acquiring the structure generator capable of generating weight matrices for different distillation structure models by changing the input knowledge distillation coding vectors.

Moreover, it is necessary to adjust the shape of the weight matrix output by the structure generator to be consistent with the number of encoder units of the input and output of the distillation structure corresponding to the knowledge distillation coding vector. The coding vectors obtained by layer sampling are consistent. The shape of the weight matrix output by the structure generator is adjusted according to the number and positions of the Transformer units with an element being 1 in the coding vector.

Figure 5:
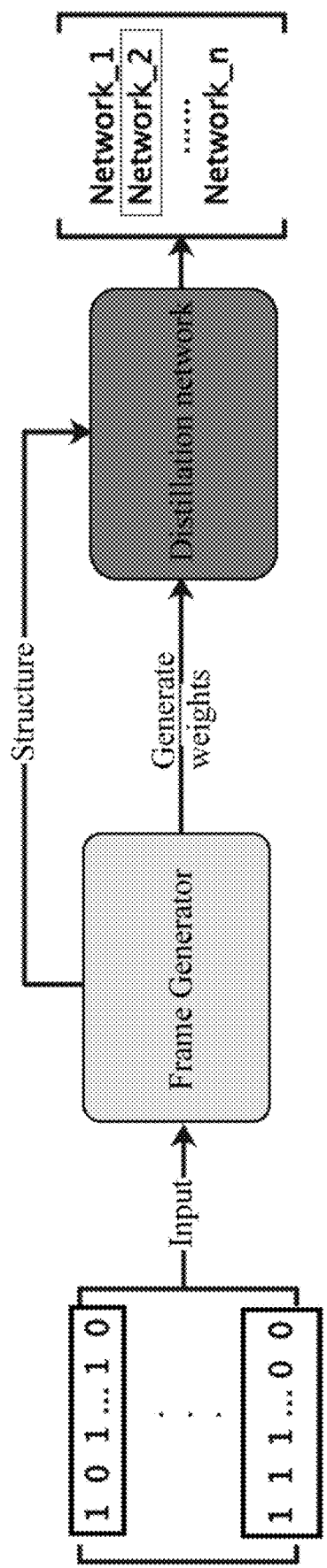
FIG. 5 is an architecture diagram of distillation network search based on an evolutionary algorithm.

The third stage: as shown in FIG. 5, it shows a process of distillation network search based on evolutionary algorithm.

On the basis of the meta-learning knowledge distillation network trained in the second stage, a plurality of knowledge distillation coding vectors satisfying specific constraints are input into the structure generator to generate corresponding weight matrices, and a plurality of distillation structure models are obtained; each distillation structure model is evaluated on a verification set to obtain the corresponding accuracy; the evolutionary algorithm is configured to search the distillation structure model with the highest accuracy that meets certain constraints (such as the number of operation times for the floating-point number), so as to obtain a common compression architecture of a task-independent pre-trained language model, such as Network_2 marked by box in FIG. 5. The specific steps of evolutionary search algorithm are as follows:

Step 1: each distillation structure model is generated by a knowledge distillation coding vector based on Transformer layer sampling, so the knowledge distillation coding vector is defined as the gene G of a distillation structure model, and a series of genes satisfying constraints C are randomly selected as an initial population.

Step 2: the reasoning accuracy accuracy of the distillation structure model corresponding to each gene $G_i$ in the existing population on the verification set, and the top k genes with the highest accuracy are selected.

Step 3: the top k genes with the highest accuracy selected in step 2 are used to carry out gene recombination and gene mutation to generate new genes, and the new genes are added into the existing population. Genetic variation refers to the variation by randomly changing the values of some elements in the gene; gene recombination refers to randomly recombining the genes of two parents to produce offspring; and the constraints C can be readily strengthened by eliminating unqualified genes.

Step 4: Step 2 and Step 3 are repeated for N rounds of iteration, the top k genes with the highest accuracy in the existing population are selected and new genes are generated until the genes with the highest accuracy that meet the constraint condition C are obtained.

The present application discloses a multi-task oriented pre-trained language model automatic compression platform, which comprises the following components:

A data loading component configured to obtain training samples of multi-task oriented pre-trained language model, wherein the training samples are tagged text samples that meet a supervised learning task.

An automatic compression component configured to automatically compress the multi-task oriented pre-trained language model, comprising a knowledge distillation vector coding module, a distillation network generation module, a structure generator and distillation network joint training module, a distillation network search module and a specific task fine-tuning module.

The knowledge distillation vector coding module comprises a layer sampling vector of Transformer; in a process of forward propagation, the knowledge distillation coding vector is input into the structure generator to generate a distillation network of a corresponding structure and a weight matrix of the structure generator.

The distillation network generation module constructs the distillation network corresponding to the currently input knowledge distillation coding vector based on the structure generator, and adjusts the shape of the weight matrix output by the structure generator to make the shape consistent with the number of encoder units of the input and output of the distillation structure corresponding to the knowledge distillation coding vector.

The structure generator and distillation network joint training module is an end-to-end training structure generator, and the knowledge distillation coding vector based on Transformer layer sampling and a small batch of training data are input into the distillation network; the weight of the distillation structure and the weight matrix of the structure generator are updated.

The distillation network search module is to search out the distillation network with the highest accuracy that meets the specific constraints, and proposes an evolutionary algorithm to search the distillation network with the highest accuracy that meets the specific constraints; the knowledge distillation coding vector is input into the trained structure generator to generate the weight of the corresponding distillation network, and the distillation network is evaluated on a verification set to obtain the accuracy of the corresponding distillation network; in the evolutionary search algorithm used in a meta-learning distillation network, each distillation network is generated by knowledge distillation coding vectors based on Transformer layer sampling, therefore the knowledge distillation coding vectors are defined as the genes of the distillation network; under specific constraints, firstly, a series of knowledge distillation coding vectors are selected as the genes of the distillation network, and the accuracy of the corresponding distillation network is obtained by evaluating on the verification set; then, the top k genes with a higher accuracy are selected, and new genes are generated by gene recombination and mutation; by further repeating the process of selecting the top k optimal genes and the process of generating new genes to iterate, the genes that meet the constraint conditions and have the highest accuracy are obtained.

The specific task fine-tuning module is to construct a downstream task network on the pre-trained model distillation network generated by the automatic compression component, fine-tune a downstream task scene by using a feature layer and an output layer of the distillation network, and output a finally fine-tuned student model, i.e., a pre-trained language model compressed model containing the downstream task required by a login user; the compressed model is output to a designated container for the login user to download, and the comparison information of the model sizes before and after compression is presented on a page of an output compressed model of the platform.

A reasoning component for the login user to obtain the pre-trained compressed model from the platform. The user uses the compressed model output by the automatic compression component to reason new data of a natural language processing downstream task uploaded by the login user on a data set of an actual scene; and the comparison information of reasoning speeds before and after compression is presented on a compressed model reasoning page of the platform.

The login user can directly download the trained pre-trained language model provided by the platform of the present application, and according to the user's demand for processing downstream tasks in a specific natural language, a downstream task network is constructed based on the compressed pre-trained model architecture generated by the platform, and is fine-tuned, and finally deployed in terminal equipment. The downstream tasks of natural language processing can also be reasoned directly on the platform.

The technical solution of the present application will be further described in detail below with the task of classifying emotions by movie reviews.

A BERT model and sentiment analysis data set SST-2 of the text classification task of a single sentence uploaded by the login user are acquired through the data loading component of the platform;

A multitask-oriented BERT pre-trained language model is generated through the automatic compression component of the platform;

The BERT pre-trained model generated by the automatic compression component is loaded through the platform, and a text classification task model is constructed on the generated pre-trained model.

The student model is fined-tuned based on the specific task fine-tuning module of the automatic compression component, the downstream text classification task scene is fined-tuned by using the feature layer and output layer of the BERT pre-trained model generated by the automatic compression component, and finally, the platform outputs a compressed model of the BERT model containing the text classification tasks required by users.

The compressed model is output to a designated container for the login user to download, and the comparison information of the model size before and after compression is displayed on the page of the output compressed model of the platform, wherein the model size before compression is 110M, after compression is 56M, and the compression is 49%. As shown in Table 1 below.

TABLE 1

Comparative information of the BERT model of a text classification task before and after compression

| Text classification task (SST-2) (including 67K samples) | Before compression | After compression | Contrast |
| --- | --- | --- | --- |
| Model size | 110M | 56M | Compressed by 49% |
| Reasoning accuracy | 91.5% | 92.0% | Increased by 0.5% |

Through the reasoning component of the platform, the compressed model output by the platform is configured to reason the SST-2 test set data uploaded by the login user, and it is displayed on the compressed model reasoning page of the platform that the reasoning speed after compression is 2.01 times faster than that before compression, and the reasoning accuracy is improved from 91.5% before compression to 92.0%.

What is claimed is:

1. A method for automatic compressing multi-task oriented pre-trained language model, comprising the following three stages:
   a first stage of constructing a knowledge distillation coding vector based on Transformer layer sampling: layer-sampling all Transformer units of a BERT model by Bernoulli distribution to generate the knowledge distillation coding vector;
   a second stage of training a knowledge distillation network of meta-learning comprising: generating a filtered knowledge distillation coding vector by: defining a search space, inputting the knowledge distillation coding vector constructed in the first stage into the search space, and removing unqualified knowledge distillation coding vectors; defining a structure generator, which takes the filtered knowledge distillation coding vector as an input, outputs a weight matrix for constructing a distillation structure model, and generates the corresponding distillation structure model; training the generated distillation structure model to update the structure generator;
   a third stage of searching the distillation structure model based on an evolutionary algorithm comprising: inputting a plurality of knowledge distillation coding vectors satisfying specific constraints into the updated structure generator in the second stage to generate the corresponding weight matrices to obtain a plurality of distillation structure models each based on one of the corresponding weight matrices; evaluating the accuracy of each of the plurality of distillation structure models; using the evolutionary algorithm to search the distillation structure model with the highest accuracy that meets the specific constraints, and obtaining a common compression structure.

2. The method for automatic compressing multi-task oriented pre-trained language model according to claim 1, wherein the first stage comprises: sequentially carrying out Bernoulli sampling on 12 layers of Transformer units of the BERT model to generate the knowledge distillation coding vector, each layer corresponding to a random variable; wherein when a probability of the random variable being 1 is greater than or equal to 0.5, an element corresponding to the knowledge distillation coding vector is 1, which represents that a current Transformer unit performs transfer learning; and when a probability value of the random variable being 1 is less than 0.5, the element corresponding to the layer sampling vector is 0, which represents that the current Transformer unit does not perform transfer learning.

3. The method for automatic compressing multi-task oriented pre-trained language model according to claim 2, wherein the step of defining a search space is that the number of elements being 1 in the knowledge distillation coding vector is not less than 6.

4. The method for automatic compressing multi-task oriented pre-trained language model according to claim 3, wherein the step of defining a structure generator comprises that the structure generator consists of two fully connected layers, the input of which is the knowledge distillation coding vector constructed in the first stage, and the output of which is the weight matrix for generating the distillation structure model.

5. The method for automatic compressing multi-task oriented pre-trained language model according to claim 4, wherein the step of training the generated distillation structure model to update the structure generator comprises the following substeps:

step (2.1): inputting the knowledge distillation coding vector into the structure generator and outputting the weight matrix;
step (2.2): constructing the distillation structure model based on the weight matrix output by the structure generator;
step (2.3): jointly training the structure generator and the distillation structure model: inputting the training data into the distillation structure model generated in step (2.2) for model training, and updating the structure generator together; meanwhile, training the structure generator by combining a Bernoulli distribution sampling method.

6. The method for automatic compressing multi-task oriented pre-trained language model according to claim 5, wherein the step (2.2) comprises: performing layer sampling knowledge distillation on each Transformer layer of a teacher network according to the knowledge distillation coding vector constructed in the first stage, wherein each element corresponds to a layer of Transformer units, initializing the Transformer units transferred by a student model by using a weight of the Transformer unit with an element corresponding to the knowledge distillation coding vector being 1 in the teacher model, the Transformer unit corresponding to the student model and the weight thereof are generated from each element with a layer sampling being 1 through the structure generator; establishing a one-to-one mapping relationship between the teacher model and the student model through the knowledge distillation coding vector, and generating a corresponding distillation network structure according to the knowledge distillation coding vector.

7. The method for automatic compressing multi-task oriented pre-trained language model according to claim 6, wherein the step of training the structure generator by combining a Bernoulli distribution sampling method specifically comprises: using Bernoulli distribution to perform layer sampling for the Transformer units in each layer to construct different knowledge distillation coding vectors, using a training data set to carry out multiple iterative trainings, training the structure generator and the distillation structure model simultaneously based on one knowledge distillation coding vector in each iteration, and acquiring the structure generator capable of generating weight matrices for different distillation structure models by changing the input knowledge distillation coding vectors.

8. The method for automatic compressing multi-task oriented pre-trained language model according to claim 7, wherein the third stage comprises the following substeps:
step (3.1): defining the knowledge distillation coding vector as genes of the distillation structure model, and randomly selecting a series of genes satisfying specific constraints as an initial population;
step (3.2): evaluating the accuracy of the distillation structure model corresponding to each gene in an existing population, and selecting top k genes with a higher accuracy;
step (3.3): using the top k genes with a higher accuracy selected in step (3.2) for gene recombination and gene mutation to generate new genes, and adding the new genes into the existing population;
step (3.4): repeating and iterating steps (3.2) to (3.3) for a set number of rounds, selecting the top k genes with a higher accuracy in the existing population and generating new genes, and finally obtaining the genes with the highest accuracy that meet the specific constraints.

9. The method for automatic compressing multi-task oriented pre-trained language model according to claim 8, wherein in step (3.3), gene mutation refers to randomly changing the values of some elements in the gene; gene recombination refers to randomly recombining the genes of two parents; new genes that do not meet the specific constraints are eliminated.

10. A platform based on the method for automatic compressing multi-task oriented pre-trained language model according to claim 1, comprising:
at least one processors, and
a memory coupled to the at least one processors, wherein the memory stores programmable instructions which cause the at least one processor to:
load obtain training samples of multi-task oriented pre-trained language model, wherein the training samples are tagged text samples that meet a supervised learning task;
automatically compress the multi-task oriented pre-trained language model;
input the knowledge distillation coding vector into the structure generator to generate a distillation network of a corresponding structure and a weight matrix of the structure generator during a process of forward propagation;
construct the distillation network corresponding to the currently input knowledge distillation coding vector based on the structure generator, and adjust the shape of the weight matrix output by the structure generator to make the shape consistent with the number of encoder units of the input and output of the distillation structure corresponding to the knowledge distillation coding vector;
input the knowledge distillation coding vector based on Transformer layer sampling and a small batch of training data into the distillation network and update the weight of the distillation structure and the weight matrix of the structure generator with an end-to-end training structure generator;
search out the distillation network with the highest accuracy that meets the specific constraints, and propose an evolutionary algorithm to search the distillation network with the highest accuracy that meets the specific constraints; input the knowledge distillation coding vector into the trained structure generator to generate the weight of the corresponding distillation network, evaluate the distillation network on a verification set to obtain the accuracy of the corresponding distillation network; generate, in the evolutionary search algorithm used in a meta-learning distillation network, each distillation network by knowledge distillation coding vectors based on Transformer layer sampling, and define the knowledge distillation coding vectors as the genes of the distillation network; under specific constraints, firstly, select a series of knowledge distillation coding vectors as the genes of the distillation network, and obtain the accuracy of the corresponding distillation network by evaluating on the verification set; then, select the top k genes with a higher accuracy and generate new genes by gene recombination and mutation; and obtain the genes that meet the constraint conditions and have the highest accuracy by further repeating the process of selecting the top k optimal genes and the process of generating new genes to iterate; and
construct a downstream task network on the pre-trained model distillation network generated by automatically compressing, turn a downstream task scene by using a feature layer and an output layer of the distillation network, and outputting a finally tuned student model which is a pre-trained language model compressed model containing the downstream task required by a login user; outputting the compressed model to a designated container for the login user to download, and present the comparison information of the model sizes before and after compression on a page of an output compressed model of the platform; and
obtain, by the login user, the pre-trained compressed model from the platform, use the compressed model output by automatically compressing to reason new data of a natural language processing downstream task uploaded by the login user on a data set of an actual scene; and present the comparison information of reasoning speeds before and after compression on a compressed model reasoning page of the platform.

* * * * *